(12) United States Patent
Jia et al.

(10) Patent No.: US 8,401,070 B2
(45) Date of Patent: Mar. 19, 2013

(54) METHOD FOR ROBUST INVERSE TELECINE

(75) Inventors: Yunwei Jia, Milton (CA); Lowell L. Winger, Waterloo (CA); Elliot N. Linzer, Suffern, NY (US)

(73) Assignee: LSI Corporation, San Jose, CA (US)

( * ) Notice: Subject to any disclaimer, the term of this patent is extended or adjusted under 35 U.S.C. 154(b) by 1589 days.

(21) Appl. No.: 11/272,300

(22) Filed: Nov. 10, 2005

(65) Prior Publication Data

US 2007/0104273 A1    May 10, 2007

(51) Int. Cl.
   *H04N 7/12*    (2006.01)
(52) U.S. Cl. .................. 375/240.01; 382/236; 382/251; 382/181; 375/240.13; 375/240.26
(58) Field of Classification Search ........................ None
See application file for complete search history.

(56) References Cited

U.S. PATENT DOCUMENTS

| | | | | |
|---|---|---|---|---|
| 5,317,398 | A * | 5/1994 | Casavant et al. | 348/570 |
| 5,734,420 | A * | 3/1998 | Lee et al. | 348/97 |
| 5,812,202 | A * | 9/1998 | Ng et al. | 348/446 |
| 6,041,142 | A * | 3/2000 | Rao et al. | 382/232 |
| 6,058,140 | A * | 5/2000 | Smolenski | 375/240.16 |
| 2005/0276324 | A1* | 12/2005 | Yankilevich | 375/240.03 |
| 2006/0098739 | A1* | 5/2006 | Linzer | 375/240.16 |
| 2007/0097259 | A1* | 5/2007 | MacInnis et al. | 348/441 |

OTHER PUBLICATIONS

Liu, M., et al., Sony Electronics Inc., "Real-Time MPEG Video Encoder with Embedded Scene Change Detection and Telecine Inverse", 2002 International Conference on Consumer Electronics, pp. 246-247.

Schutten, R.J., et al., Philips Research Laboratories, "Real-Time 2-3 Pull-Down Elimination Applying Motion Estimation/Compensation in a Programmable Device", IEEE Transactions on Consumer Electronics, Aug. 1998, pp. 930-938.

de Hann, G., et al., "An Evolutionary Architecture for Motion-Compensated 100 Hz Television", IEEE Transactions on Circuits and Systems for Video Technology, Jun. 1995, pp. 207-217.

Mailhot, J.N., et al., "The Grand Alliance HDTV Video Encoder", IEEE Transactions on Consumer Electronics, Nov. 1995, pp. 1014-1018.

* cited by examiner

*Primary Examiner* — Chan S Park
*Assistant Examiner* — Mark Roz
(74) *Attorney, Agent, or Firm* — Christopher P. Paiorana, PC

(57) ABSTRACT

A method for inverse telecine. The method generally includes the steps of (A) checking if a current field of a plurality of fields in a video sequence repeats in the video sequence according to a pattern-based approach where the current field fits a telecine pattern, (B) checking if the current field repeats according to a first pattern-less approach where the current field complies with at least one of a plurality of rules and (C) generating a signal for an encoder in (i) an asserted state if the current field repeats and (ii) a deasserted state if the current field does not repeat.

24 Claims, 6 Drawing Sheets

TABLE I

| SEQUENCE NAME | TYPE (SOURCE AND PATTERN) | NUMBER OF FIELDS | TOTAL REPEATS | DETECTED REPEATS | FALSE POSITIVE | FALSE NEGATIVE |
|---|---|---|---|---|---|---|
| star_1 | movie, DVD, Fig. 1 | 600 | 119 | 115 | 0 | 4 |
| MIP_2 | movie, DVD, Fig. 1 | 600 | 118 | 116 | 0 | 2 |
| space | movie, satellite, Fig. 1 | 600 | 119 | 106 | 1 | 14 |
| MUCH_004 | music TV, satellite, Fig. 1 | 600 | 119 | 106 | 0 | 13 |
| MMM_001 | much more music, satellite, Fig. 1 | 600 | 118 | 100 | 0 | 18 |
| CMT_004 | country music, satellite, Fig. 1 | 600 | 119 | 118 | 0 | 1 |
| peterpan_01 | cartoon, DVD, Fig. 1 & 2 | 600 | 288 | 259 | 0 | 29 |
| franklin | cartoon, satellite, Fig. 1 & 2 low motion, some stills | 600 | 295 | 126 | 0 | 169 |
| dragt | cartoon, satellite, Fig. 1 & 2 | 600 | 319 | 176 | 0 | 143 |
| clifford_443 | cartoon, satellite, Fig. 3 & 4 | 600 | 265 | 172 | 0 | 93 |
| PAL_cartoon_12 | VHS, cartoon | 600 | 126 | 44 | 0 | 82 |
| PAL_cartoon_13 | VHS, cartoon | 600 | 294 | 87 | 0 | 207 |
| PAL_cartoon_22 | DVD, cartoon | 930 | 140 | 69 | 0 | 71 |
| PAL_cartoon_31 | DVD, cartoon | 1792 | 220 | 129 | 2 | 93 |
| test_pattern | test patterns, interlaced | 306 | 0 | 0 | 0 | 0 |
| sage_flag | waving flag, interlaced | 200 | 0 | 0 | 0 | 0 |
| f1 | race car, interlaced | 200 | 0 | 0 | 0 | 0 |
| CNN | news, interlaced | 600 | 0 | 0 | 0 | 0 |
| demo | "football", "cheerleader", and more, interlaced, | 3680 | 0 | 0 | 0 | 0 |

FIG. 10

METHOD FOR ROBUST INVERSE TELECINE

FIELD OF THE INVENTION

The present invention relates to inverse telecine generally and, more particularly, to a method for robust inverse telecine.

BACKGROUND OF THE INVENTION

Films are conventionally shot at 24 frames per second. In order to smoothly play a film on a television set, the film has to be converted to either a National television System Committee (NTSC) video format (i.e., interlaced 60 fields per second), or a Phase Alternate Line (PAL) video format (i.e., interlaced 50 fields per second) in a process called telecine. In the telecine process, each frame of the film is decomposed into two fields of video, a top field and a bottom field. In the case of converting into NTSC, some of the video fields are repeated. To efficiently encode such a video sequence, it is desirable to detect the repeated fields before actual encoding starts. The process of detecting the repeated fields in a video sequence generated by the telecine process is called inverse telecine. The detection problem is more complicated than expected for several reasons, such as noise introduced in the video processing chain, scene changes and post-editing.

A conventional method to detect repeated fields in a telecined field sequence is to compute a difference between a current field and a previous same-parity field then compare the difference with a predetermined threshold. If the difference is less than the threshold, the current field is declared as a repeated field. The difference can be measured as sum of absolute differences (SAD) or sum of squared differences (SSD) between the two fields. In some real-time systems, the difference is only available at a field level or a strip level (i.e., a strip is a number of horizontal lines of a field), but not at a macroblock level or a pixel level.

The conventional method is very simple to implement in both hardware and software, but is not reliable due to the following reasons. First, the conventional method utilizes knowledge of a noise level in the telecined sequence to determine the threshold. The noise level knowledge is rarely available because different telecine machines generate different noise levels. Furthermore, the noise levels vary with the initial encoding process in transcoding applications. Second, some particular fields may be incorrectly detected as repeated fields (i.e., false positive detections) in scenes with slow motion and/or low-motion because the field differences are very small.

To improve the reliability of inverse telecine, field-to-field motion vectors are conventionally used to detect the repeated fields. In another conventional method, motion estimation is performed between two consecutive same-parity fields. If a field repeats a previous same-parity field, the resulting motion vectors are mainly of zero length. The zero-length motion vectors are used to detect repeated fields. In another conventional method, motion estimation is performed between two fields of the same parity, but the two fields are not limited to be neighbors. Depending on the picture coding structure, the motion vectors of a repeated field are either very small compared with those of the previous same-parity field, or almost identical to those of the previous same-parity field. The very small or almost identical motion vectors are used to detect repeated fields.

The motion vector type methods are not suitable for some video coding systems where field-to-field motion estimation is not available. For example, an efficient way to encode a video sequence converted from a film material is to detect the repeated fields in the video sequence, combine the two fields from the same film frame into a frame and then perform frame coding. In such situations, field-to-field motion estimation cannot be directly shared by the inverse telecine module and the actual encoding module, resulting in extra cost.

Another type of method to improve the reliability of inverse telecine is to explicitly utilize known telecine patterns. Ten consecutive fields can be examined to match the telecine patterns. If a match is found, the field at a certain position is declared as a repeated field. If a video sequence generated from the telecine process contains mainly regular patterns, some conventional methods work fairly well. However, the resulting patterns may be quite irregular due to post-editing, scene changes, speed varying and insertion of video effects such as fades.

SUMMARY OF THE INVENTION

The present invention concerns a method for inverse telecine. The method generally comprises the steps of (A) checking if a current field of a plurality of fields in a video sequence repeats in the video sequence according to a pattern-based approach where the current field fits a telecine pattern, (B) checking if the current field repeats according to a first pattern-less approach where the current field complies with at least one of a plurality of rules and (C) generating a signal for an encoder in (i) an asserted state if the current field repeats and (ii) a deasserted state if the current field does not repeat.

The objects, features and advantages of the present invention include providing a method and/or architecture for robust inverse telecine that may (i) combine an approach based on telecine patterns (e.g., pattern-based approach) and an approach that does not utilize explicit telecine patterns (e.g., pattern-less approach), (ii) consider both regular 3:2 pull-down patterns and various cartoon pull-down patterns in the pattern-based approach, (iii) detect repeated fields in video sequences with regular telecine patterns and/or irregular telecine patterns, (iv) properly handle cases of scene changes and post-edits where the regular telecine patterns are broken and/or (v) properly handle transitions between different patterns.

BRIEF DESCRIPTION OF THE DRAWINGS

These and other objects, features and advantages of the present invention will be apparent from the following detailed description and the appended claims and drawings in which:

FIG. 10 is a TABLE 1 of experimental results.

DETAILED DESCRIPTION OF THE PREFERRED EMBODIMENTS

The present invention generally combines an approach based on telecine patterns (e.g., pattern-based approaches) and an approach that does not utilize explicit telecine patterns (e.g., pattern-less approaches). In the pattern-based approach, a regular 3:2 pull-down pattern and one or more cartoon pull-down patterns may be considered.

In a first pattern-less approach, an existence of a particular pattern in a field sequence may be uncertain. Instead, knowledge of telecine patterns may be integrated into decision rules. Examples of such knowledge about telecine patterns include, but are not limited to, (i) a minimum number and a maximum number of repeated fields over a window of a certain number of fields and (ii) a minimum number and a maximum number of non-repeated fields over a window of a certain number of fields.

In a second pattern-less approach, the candidacy of the field to be a repeated field may be determined. The candidacy may be based on (i) a sum of absolute differences (SAD) and/or a DC difference (DC_diff) between a current field and previous neighbor fields and (ii) statistics of the previous neighbor fields in a small window. If the current field is determined to be a candidate, a determination may be made whether or not the current field is indeed a repeated field based on a relatively longer history of the current field.

Figure 1:
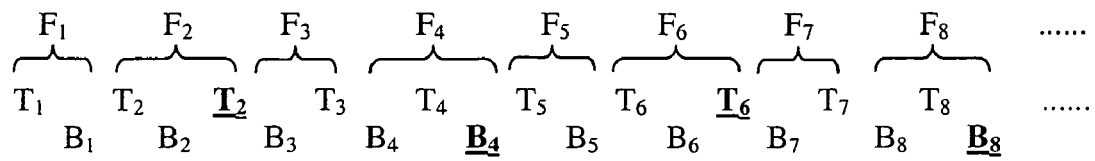
FIG. 1 is a diagram of an example 3:2 pull-down pattern for an original film frame sequence.

Referring to FIG. 1, a diagram of an example 3:2 pull-down pattern for an original film frame sequence is shown. The 3:2 pull down sequence (or pattern) generally comprises a repeated field following four non-repeated fields. In the figures, the repeated fields are generally highlighted by underlining.

A 3:2 pull-down telecine process generally converts a video frame sequence into a video field sequence with some repeated fields. For example, let $F_1$ $F_2$ $F_3$ . . . be a frame sequence of a film that may be generated at a number of frames (e.g., 24) per second. To convert the frame sequence into a field sequence of a National Television System Committee (NTSC) video, the following telecine process is generally used. Frame $F_1$ may be decomposed into two fields (e.g., $T_1$ and $B_1$, where "T" generally stands for a top field and "B" for a bottom field.) Frame $F_2$ may be decomposed into two fields, (e.g., $T_2$ and $B_2$). The field $T_2$ may then be repeated after the field $B_2$ such that three fields (e.g., $T_2$, $B_2$, $T_2$) are generally created from the frame $F_2$ whereas two fields (e.g., $T_1$ and $B_1$) are generally created from the frame $F_1$. Frame $F_3$ may be decomposed into two fields (e.g., $T_3$ and $B_3$). Frame $F_4$ may be decomposed into two fields (e.g., $T_4$ and $B_4$). The field $B_4$ may then be repeated after the field $T_4$. The above procedure generally repeats itself until all of the frames are processed.

As the result of the 3:2 pull-down process, every 24 frames of film may be converted into 60 fields of video. From FIG. 1, a regular pattern may be seen such that a repeated field appears after every four non-repeated fields. Hereafter, the above five consecutive fields are generally referred to as a 3:2 cycle of the pattern. The 3:2 pull-down process is commonly used in generating programs recorded on Digital Versatile Disks (DVDs).

Figure 2:
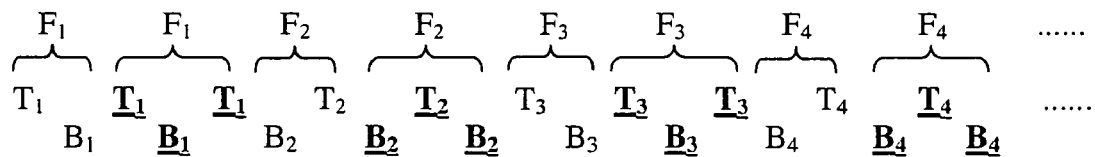
FIG. 2 is a diagram of a first example telecine pattern for an original cartoon frame sequence.

A cartoon film converted into NTSC video generally uses a field pattern different than the 3:2 pull-down method. The different field pattern may occur in cartoon production because (i) 24 frames per second are normally drawn for scenes with moderate to fast motion and (ii) 12 frames per second followed by frame doubling are normally drawn for scenes with slow motion. Therefore, the frame sequence may look like $F_1$ $F_1$ $F_2$ $F_2$ $F_3$ $F_3$ $F_4$ $F_4$ . . . for scenes with slow motion in a cartoon film. If the slow motion frame sequence is passed through the 3:2 pull-down process, the first cartoon pattern as shown in FIG. 2 may appear in the generated video field sequence. The first cartoon pattern shown in FIG. 2 may co-exist with the 3:2 pattern shown in FIG. 1 in a cartoon sequence because both patterns may be generated from the same telecine method.

Referring to FIG. 2, a diagram of a first example telecine pattern for an original cartoon frame sequence is shown. The first telecine cartoon pattern (or sequence) generally comprises (i) a first cartoon cycle having two non-repeated fields followed by (ii) three repeated fields. As such, each frame of the cartoon film may be repeated twice in the telecine sequence. The first telecine pattern may be applied to periods of slow motion in the cartoon film.

Figure 3:
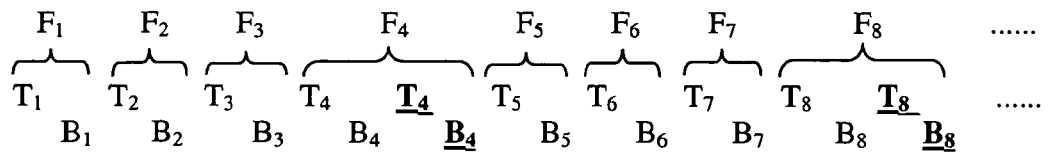
FIG. 3 is a diagram of a second example telecine pattern for the original cartoon frame sequence.

Referring to FIG. 3, a diagram of a second example telecine pattern for the original cartoon frame sequence is shown. The second telecine cartoon pattern (or sequence) generally comprises a first cartoon cycle having eight non-repeated fields followed by two repeated fields. A top field and a bottom field corresponding to every fourth frame of the cartoon film may be repeated. The second telecine pattern may be applied to periods of fast motion in the cartoon film.

Figure 4:
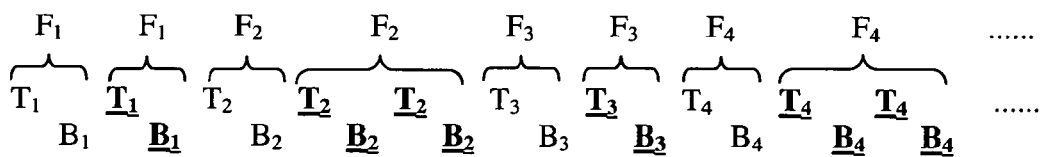
FIG. 4 is a diagram of a third example telecine pattern for the original cartoon frame sequence.

Referring to FIG. 4, a diagram of a third example telecine pattern for the original cartoon frame sequence is shown. The third telecine cartoon pattern (or sequence) generally comprises (i) two non-repeating fields, (ii) two repeating fields, (iii) two non-repeating fields then (iv) four repeating fields. The third telecine pattern may be applied to periods of slow motion in the cartoon film.

The third telecine pattern may co-exist with the second telecine pattern in FIG. 3 in a telecined cartoon sequence, since the two patterns are generally created from the same telecine method. However, a first set of the patterns in FIG. 1 and FIG. 2 generally do not co-exist with a second set of the patterns in FIG. 3 and FIG. 4, since the two sets may be generated from different telecine methods.

Figure 5:
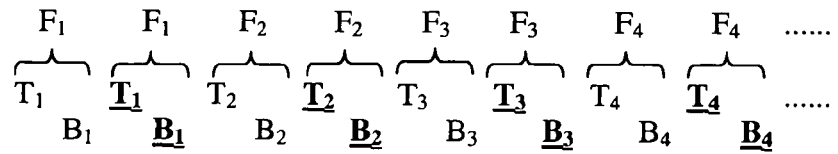
FIG. 5 is a diagram of an example Phase Alternate Line telecine pattern for the original cartoon frame sequence.

Referring to FIG. 5, is a diagram of an example Phase Alternate Line (PAL) telecine pattern for the original cartoon frame sequence is shown. When a film is converted into the PAL video format, each frame of the film may be decomposed into two fields of video. Generally, no repeated fields are inserted in the pattern. As a result, the converted PAL video may run approximately 4% faster than the original film. The above process is generally called 2:2 pull-down process. The 2:2 pull-down may be applied to a cartoon sequence produced at 12 frames per second followed by frame doubling. A pattern (or sequence) comprising (i) two repeated fields followed by (ii) two non-repeated fields may appear in the converted video sequence as illustrated in FIG. 5.

Statistics may be used to detect repeated fields in a video sequence having a telecine pattern. Let $H_i$ be a field. Let $G_i$ be the output generated by passing the field $H_i$ through a multi-tap (e.g., 3-tap) horizontal filter with fixed coefficients (e.g., 1/4, 1/2, 1/4). Each field ($H_i$ and $G_i$) is generally divided into strips. Each strip may be multiple (e.g., 32) horizontal lines high. Let a variable (e.g., DC_diff(i)) be a maximum of DC differences between co-located strip pairs in the field $H_i$ and a field $H_{i-2}$. A calculation of the variable DC_diff(i) may exclude a top strip and a bottom strip of the fields. Let SAD(i) be the maximum of the SADs between co-located strip pairs in the fields $G_i$ and $G_{i-2}$, excluding the top strips and bottom strips. The top strips and bottom strips may be excluded in computing the statistics because, if noise exists in a video field, the top strip and the bottom strip of the field may be more likely to be noisy than the strips in the middle. Processing the field $H_i$, generally does not use statistics for any field $H_j$ with j>i. The present invention may be implemented without utilizing a look-ahead capability.

Figure 6:
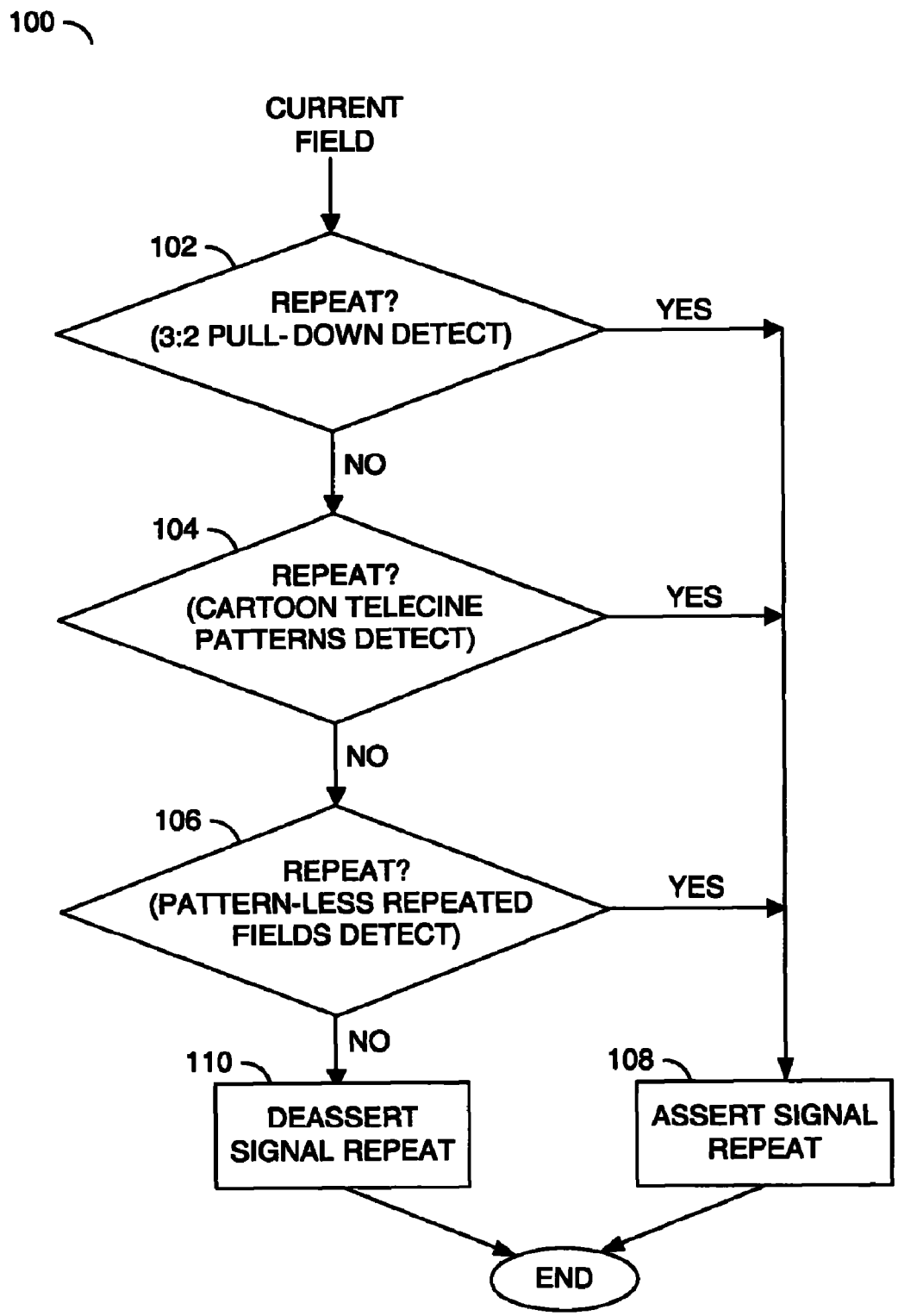
FIG. 6 is a flow chart of an example method for inverse telecine in accordance with a preferred embodiment of the present invention.

Referring to FIG. 6, a flow chart of an example method 100 for inverse telecine is shown in accordance with a preferred embodiment of the present invention. The method 100 generally comprises a step (or block) 102, a step (or block) 104, a step (or block) 106, a step (or block) 108 and a step (or block) 110. If a current input field (e.g., H) is detected as a repeated field at any step, the inverse telecine method 100 generally ends and the current input field H may be declared as a repeated field. If the current input field H is not detected as a repeated field by any of the steps, the current input field H may be declared as a non-repeated field.

The step 102 may be operational to check if the current field $H_i$ is a repeated field based on the 3:2 pull-down telecine pattern. The step 104 may be operational to check if the current field $H_i$ is a repeated field based on one or more cartoon telecine patterns. The step 106 may be operational to check if the current field $H_i$ is a repeated field based on a pattern-less repeated field process. If any of the steps 102, 104 or 106 determine that the current field $H_i$ is a repeat, the step 108 may be operational to generate a signal (e.g., REPEAT) in an asserted state (or condition). If all of the steps 102, 104 and 106 fail to identify the current field $H_i$ as a repeated field, the step 110 may be operational to generate the signal REPEAT in a deasserted state (or condition).

Figure 7:
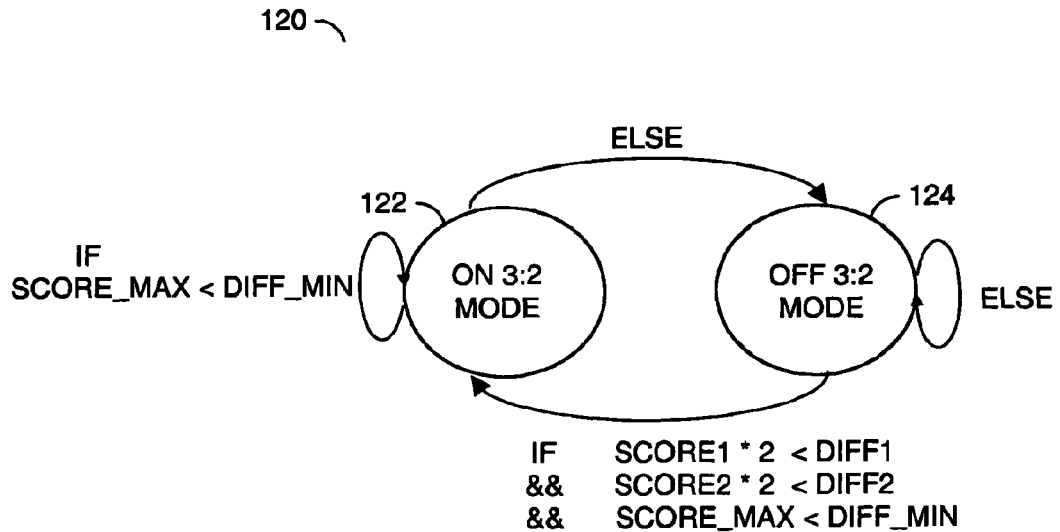
FIG. 7 is an example state transition diagram based on the 3:2 pull down process.

Referring to FIG. 7, an example state transition diagram 120 based on the 3:2 pull down process is shown. The state transition diagram 120 generally comprises a state 122 and a state 124. The state 122 may be referred to as an ON 3:2 MODE. The state 124 may be referred to as an OFF 3:2 MODE. The OFF 3:2 MODE may be an initial mode. In processing the current field $H_i$, the ON 3:2 MODE generally means that there is a repeated field detected in the previous 5 fields (e.g., $H_{i-1}$ to $H_{i-5}$). The OFF 3:2 MODE generally means that none of the previous 5 fields is detected as a repeated field.

Figure 8:
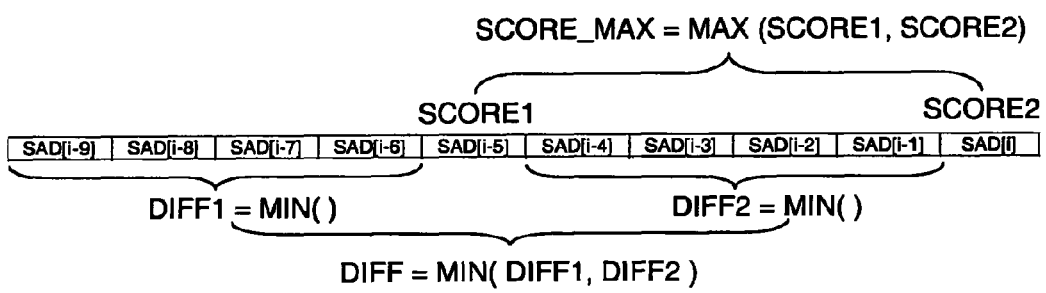
FIG. 8 is a diagram of an example set of sum of absolute differences values.

Referring to FIG. 8, a diagram of an example set of SAD values is shown. Let an SAD of the current field $H_i$ be stored in SAD[i]. Let:

SCORE1=SAD[i−5],

SCORE2=SAD[i],

DIFF1=MIN (SAD[i−6], SAD[i−7], SAD[i−8], SAD[i−9]),

DIFF2=MIN (SAD[i−1], SAD[i−2], SAD[i−3], SAD[i−4]),

DIFF_MIN=MIN(DIFF1, DIFF2),

SCORE_MAX=MAX (SCORE1, SCORE2).

Referring again to FIGS. 6 and 7, the transition conditions between the ON 3:2 MODE and the OFF 3:2 MODE are generally shown in FIG. 7. The current field $H_i$ may be declared as a repeated field in the step 102 (FIG. 6) whenever a transition into the ON 3:2 MODE occurs. Transitions into the ON 3:2 MODE may be (i) from the ON 3:2 MODE to the ON 3:2 MODE and (ii) from the OFF 3:2 MODE to the ON 3:2 MODE.

Furthermore, consider the patterns shown in FIG. 2 and FIG. 5 for repeated fields detect based on 3:2 pull-down pattern with no pattern transitions allowed. For the current field $H_i$, a binary function r(i) may be defined as follows.

$r(i) = 1$ if $SAD[i] < 1.75 \times \text{Number\_of\_pixels\_in\_a\_strip}$ &&

$SAD[i] \times 4 < \text{MAX}(SAD[j], j = i-1, \ldots, i-4)$ or $SAD[i] <$ $3.5 \times \text{Number\_of\_pixels\_in\_a\_strip}$ &&

$SAD[i] \times 6 < \text{MAX}(SAD[j], j = i-1, \ldots, i-4)$ $= 0$ otherwise.

Let R be an n-bit (e.g., 20-bit) unsigned integer with a least significant bit $R_0=r(i)$, $R_1=r(i-1)$, $R_2=r(i-2)$, ..., $R_{n-2}=r(i-(n-2))$ and the most significant bit $R_{n-1}=r(i-(n-1))$. The current field $H_i$ is generally declared as a repeated field in the step 104 if the following conditions are satisfied:

R==0xCE739||R==0x9CE73||R==0x39CE7 or R==0x33333.||R==0x99999.

Otherwise, the current field $H_i$ may be declared as a non-repeated field. Each of 0xCE739, 0x9CE73, and 0x39CE7 generally contains four cycles of the pattern shown in FIG. 2. Each of 0x33333 and 0x99999 generally contains five cycles of the pattern shown in FIG. 5.

The decision rules in the step 106 are generally organized at two levels. First, a candidacy of the current field H to be a repeated field based on the SAD and DC_diff of the current field H and one or more previous neighbor fields in a small window may be determined. Second, if the current field H is determined to be a candidate in the prior step, whether or not the current field H is actually a repeated field may be determined based on a relatively longer history of the current field H. The history of the current field H may not explicitly match with any certain telecine pattern. Instead, implicit knowledge of many telecine patterns may be integrated into a set of decision rules at both levels.

For an current input field $H_n$, a function CPD(n) (Candidate Probability Detection) may be defined to represent a candidacy. A value of CPD(n)=1 generally means that the current field $H_n$ is a candidate of a repeated field. A value of CPD(n)=0 generally means that the current field $H_n$ is not a repeated field. The function CPD(n) may be (i) set to 1 if all of the following. conditions are satisfied and (ii) set to 0 if one or more of the conditions are not satisfied:

1) $SAD(n) < 1.75 \times \text{Number\_of\_pixels\_in\_a\_strip}$

2) $\sum_{i=1}^{9} [SAD(n-i) > 2.5 \times SAD(n)] \geq 3$

3) $DC\_diff(n) < 0.75 \times \text{Number\_of\_pixels\_in\_a\_strip}$

4) $\sum_{i=1}^{9} [DC\_diff(n-i) > 2 \times DC\_diff(n)] \geq 3$

5) In the eight fields $H_{n-7}, H_{n-6}, \ldots, H_{n-1}$ and $H_n$, no more than four consecutive fields generally satisfy the conditions 1) through 4).

A repeated field should not be noticeably different from the previous same-parity field. The conditions 1) and 3) may prevent such a field from being declared as a repeated field. A repeated field should have a relatively small SAD and DC_diff, as reflected in the conditions 2) and 4). The condition 2) generally means that a window of the most recent nine fields may have at least three fields with SADs greater than 2.5×SAD(n). The condition 4) generally means that in the same window, at least three fields with DC_diff greater than 2×DC_diff(n) may exist. The window size may be set to 9 in the conditions 2) and 4) for the following reason. Normally, in a window of 9 consecutive fields of a telecined sequence, at least 3 non-repeated fields generally exist. Any window having a size smaller than 9 generally may not guarantee 3 non-repeated fields, as illustrated in FIGS. 1-5.

The condition 5) generally states that, if the five consecutive fields $H_{j-4}$, $H_{j-3}$, $H_{j-2}$, $H_{j-1}$ and $H_j$ satisfy the first four conditions above, then the four fields, $H_j$, $H_{j+1}$, $H_{j+2}$, and $H_{j+3}$, may not be considered as candidates for repeated fields. The non-repeat condition is generally based on the fact that no more than four repeated fields may appear consecutively in a-regularly telecined sequence, as illustrated in FIGS. 1-5. The condition 5) is generally intended to prevent false positives in scenes with slow motion and/or low motion.

The current field $H_n$ may be (i) declared as a repeated field if all the following three conditions are satisfied and (ii) declared as a non-repeated field otherwise:

6) $CPD(n) = 1$

7) $\sum_{i=1}^{32} CPD(n-i) \geq 4$

8) $SAD(n) < 1.75 \times RunAvg$ where RunAvg may be a running average of the most recent 4 SADs whose corresponding CPDs may be equal to 1.

The condition 6) generally means that the current field $H_n$ may be a candidate to be a repeated field. The condition 7) is generally based on having at least 4 repeated fields in a long window of 32 consecutive fields in a regularly telecined sequence. The condition 7) may be independent of an existence of any particular pattern. Instead, a minimum number of candidates should appear in the recent history of the current field $H_n$. The condition 7) generally makes the process robust in dealing with various situations. For example, the condition 7) may allow for transitions between different patterns. Furthermore, the condition 7) may properly handle scene changes where the regular patterns are often broken.

The condition 8) generally means that to be a repeated field, the current field $H_n$ should have an SAD not much larger than the SADs of the previous candidates. The SADs of the previous candidates may be tracked by the running average RunAvg.

Figure 9:
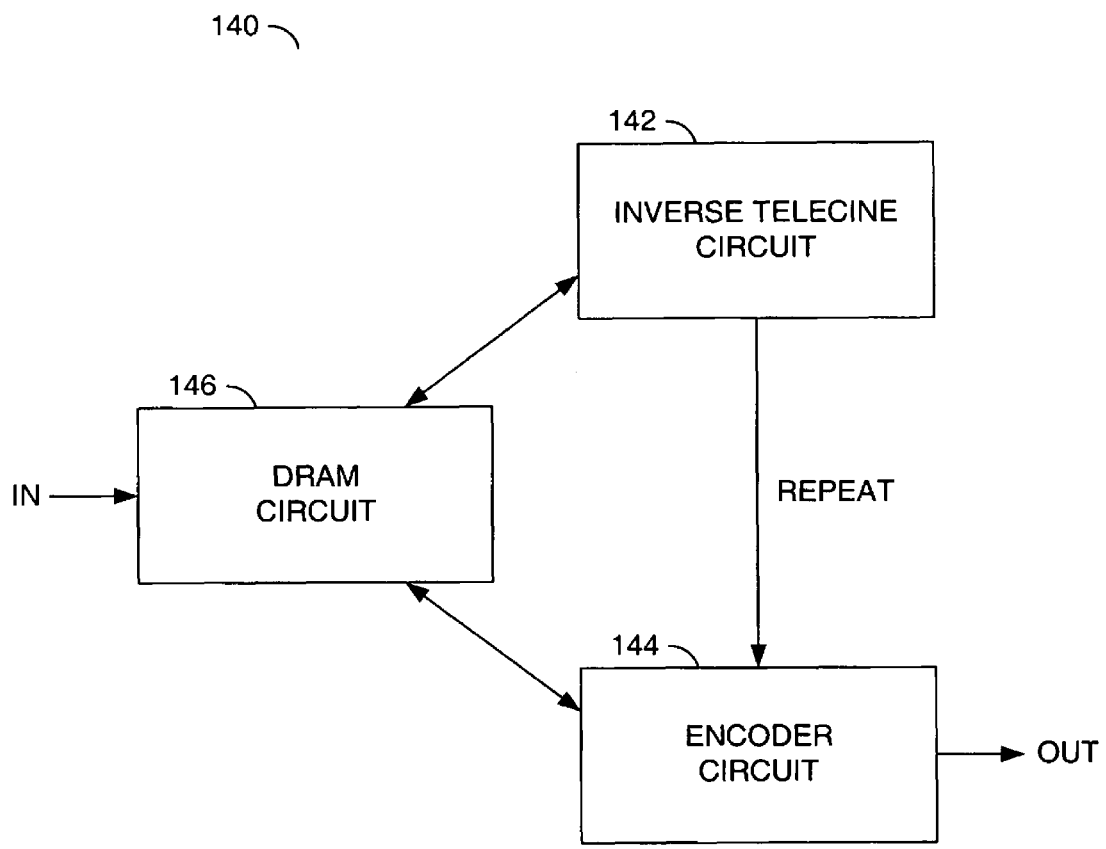
FIG. 9 is a block diagram of an example system implementing the present invention.

Referring to FIG. 9, a block diagram of an example system 140 implementing the present invention is shown. The system (or apparatus) 140 generally comprises a circuit (or module) 142, a circuit (or module) 144 and a circuit (or module) 146. A signal (e.g., IN) may be received by the circuit 146. A signal (e.g., OUT) may be generated and present by the circuit 144. The signal REPEAT may be generated by the circuit 142 and transferred from the circuit 142 to the circuit 144.

The signal IN may be a digitized video signal that has undergone telecine processing. The signal IN generally comprises a sequence of fields created from a sequence of film frames and/or a sequence of cartoon frames. The signal OUT may be a compressed bitstream. The compressed bitstream generally represents the digitized video signal in a compressed form.

The circuit 146 may be referred to as a memory circuit. The memory circuit 146 may be configured to buffer up to a predetermined number of fields received in the signal IN. The buffered fields may be transferred to the circuit 142 and the circuit 144 for processing. The memory circuit 146 may be implemented as a dynamic random access memory (DRAM). In some embodiments, the memory circuit 146 may be implemented as a double data rate memory. Other memory technologies may be implemented to meet the criteria of a particular application. The memory circuit 146 may be fabricated on a first chip separate from a second chip containing the circuit 142 and the circuit 144.

The circuit 142 may be referred to as an inverse telecine circuit. The inverse telecine circuit 142 may be operational to detect when fields in the signal IN are repeats. Assertion and deassertion of the signal REPEAT may be performed by the inverse telecine circuit 142 according to the method 100 and the state transition diagram 120. The inverse telecine circuit 142 may be coupled to the memory circuit 146 to access the current field under consideration and one or more previous fields.

The circuit 144 may be referred to as an encoder circuit. The encoder circuit 144 may be operational to compress the fields received in the signal IN to generate the signal OUT. Encoding performed by the encoder circuit 144 may be based in part on the signal REPEAT. If the signal REPEAT is asserted for the current field, the encoder circuit 144 may skip encoding the current field in some embodiments. Instead, a marker may be inserted into the signal OUT to indicate that encoding of the current field was skipped. In other embodiments, the encoder circuit 144 may establish the same-parity previous field (of which the current field is a repeat) as a reference picture used in encoding the current field. If the signal REPEAT is deasserted, the encoder circuit 144 may be operational to perform a conventional encoding of the current field. The current field may be encoded as one of an intra-encoded field (e.g., an I-field), a predicted field (e.g., a P-field) or a bidirectional predicted field (e.g., a B-field). Various encoding standards may be implemented to meet the criteria of a particular application.

Tests of the present invention were conducted on 19 film sequences. The experimental results are generally listed in TABLE 1 as shown in FIG. 10. From TABLE I, the tests generally showed the following:

Very low false positive rates were measured for all of the test sequences. The low false positive rates may be important because false positives (e.g., declaring the current field to be a repeated field when the current field is actually a non-repeated field) are generally considered to be more serious mistakes than false negatives (e.g. declaring the current field to be a non-repeated field when the current field is actually a repeated field).

For sequences generated from a 3:2 pull-down process (e.g., the first six sequences in the table), an average false negative rate of about 7% was measured. The 7% average is slightly better than that of some conventional processes.

For cartoon sequences, an average false negative rate of about 47% was measured. In contrast, the average false negative rate of some conventional processes is almost 100% (e.g., almost no repeated fields are generally detected). The relatively high conventional false negative rates for cartoons may be because cartoons tend to contain scenes with slow motion and/or low motion. The slow motion and/or low motion scenes are often difficult to distinguish from noise in the cartoon sequences.

The performance of present invention may be further improved by one or more of the following approaches. Macro-block level statistics may be used to keep the false positive rate at very low level. Reducing the false positive rate may also reduce the false negative rate. Macro-block level statistics may be especially useful for scenes with low-motion.

Using different parameters for different types of video materials may also provide improved performance. For example, video materials on VHS media normally have relatively high noise. For such materials, the thresholds in the conditions 1) and 3) may be made large to detect more repeated fields.

The present invention may be useful in a variety of applications. For example, the inverse telecine information in the signal REPEAT may be used to efficiently encode a video sequence. In particular, the detected repeated fields may be signaled by in a bitstream with a small number of bits. Furthermore, several video coding standards, such as MPEG-2 and H.264/AVC, generally include syntax elements to indicate repeated/skipped fields.

The inverse telecine information may be used in video processing to reduce cross-chrominance (cross-chroma) noise. Cross-chroma noise generally occurs when a luminance signal contains frequency components near a color sub-carrier frequency and spurious colors are generated in the picture. The cross-chroma artifacts in the repeated pair of fields generally oscillate between two values. A mean of the two values may be an artifact-free chroma value for both fields. For a repeated field, averaging the chroma values of the current field with the repeated field may remove the cross-chroma noise. For a non-repeated field, if good motion matches are found from the current field to each of the two fields in a repeated pair, then an average of the two motion-compensated chroma samples may be an artifact-free chroma value for the current field.

The inverse telecine information may be used in video processing to reduce random noise. For example, an averaging of repeated fields may reduce the level of random noise. Furthermore, in motion compensated noise reduction, the noise-reduced repeated fields may serve as good reference fields.

The function performed by the flow diagram and state transition diagram of FIGS. 6 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for inverse telecine, comprising steps of:
    (A) checking if a current field of a plurality of fields in a video sequence is a repeated field in said video sequence according to a pattern-based approach, wherein said pattern-based approach determines whether said current field is part of one of a plurality of predetermined telecine patterns;
    (B) checking if said current field is a repeated field according to a first pattern-less approach when said pattern-based approach does not find that said current field is a repeated field according to any of said plurality of predetermined telecine patterns, wherein (i) said first pattern-less approach indicates that said current field is a repeated field when said current field complies with a plurality of rules, (ii) said rules comprise limits regarding a number of repeated fields and a number of non-repeated fields in a window of time comprising a predetermined number of said fields, (iii) said limits are based on one or more characteristics of telecine patterns, and (iv) said first pattern-less approach determines whether said current field is a repeated field based upon said one or more characteristics rather than finding an explicit telecine pattern within said window, and wherein said current field is considered to be a candidate for being a repeated field when (i) a maximum sum of absolute differences (SAD) between co-located strip pairs is less than a product of a first predetermined value and a number of pixels in a strip, (ii) a maximum DC difference between co-located strip pairs in said current field and the immediately preceding field of the same parity is less than a product of a second predetermined value and the number of pixels in a strip, (iii) a number of fields in the window with SADs greater than a product of a third predetermined value and the SAD of the current field is greater than or equal to three, (iv) a number of fields in the window with a maximum DC difference greater than a product of a fourth predetermined value and the maximum DC difference of the current field is greater than or equal to three, and (v) in the current field and the seven preceding fields no more than four consecutive fields satisfy conditions (i) through (iv);
    (C) generating a signal in (i) an asserted state when said current field is determined to be a repeated field by either said pattern-based approach or said pattern-less approach and (ii) a deasserted state if said current field is not determined to be a repeated field by said pattern-based approach and said pattern-less approach; and
    (D) encoding said current field using an encoder, wherein said encoder receives said plurality of fields in said video sequence and encodes said current field in an encoded bitstream by replacing said current field with a marker representing the current field when said signal is in said asserted state, and encoding the current field in the encoded video bitstream when said signal is in said deasserted state.

2. The method according to claim 1, wherein step (A) comprises a sub-step of:
    checking if said current field repeats in a 3:2 pull-down telecine pattern.

3. The method according to claim 1, wherein step (A) comprises a sub-step of:
    checking if said current field repeats in a first cartoon telecine pattern.

4. The method according to claim 3, wherein step (A) further comprises a sub-step of:

checking if said current field repeats in a second cartoon telecine pattern that is a different cartoon telecine pattern than said first cartoon telecine pattern.

5. The method according to claim 1, further comprising a step of:
confirming whether said current field is a repeated field using a second pattern-less approach when said first pattern-less approach finds that said current field is a repeated field, wherein said second pattern-less approach compares a plurality of current statistics of said current field with a plurality of previous statistics of a previous field of said video sequence and indicates that said current field is a repeated field when said current statistics approximate said previous statistics.

6. The method according to claim 1, wherein said limits comprise:
a minimum number of said repeated fields and a maximum number of said repeated fields over said window, wherein said maximum number is larger than said minimum number.

7. The method according to claim 1, wherein said limits comprise:
a minimum number of said non-repeated fields and a maximum number of said non-repeated fields over said window, wherein said maximum number is larger than said minimum number.

8. The method according to claim 1, further comprising steps of:
marking said current field as skipped in said encoded bitstream in response to said signal being in said asserted state; and
encoding said current field as one of an intra-predicted field, a predicted field and a bidirectional field in response to said signal being in said deasserted state.

9. A method for inverse telecine, comprising steps of:
(A) checking if a current field of a plurality of fields in a video sequence is a repeated field in said video sequence according to a first pattern-less approach where said current field is not part of any of a plurality of predetermined telecine patterns, wherein (i) said first pattern-less approach indicates that said current field is a repeated field when said current field complies with a plurality of rules, (ii) said rules comprise limits regarding a number of repeated fields and a number of non-repeated fields in a first window of time comprising a predetermined number of said fields, (iii) said limits are based on one or more characteristics of telecine patterns, and (iv) said first pattern-less approach determines whether said current field is a repeated field based upon said one or more characteristics rather than finding an explicit telecine pattern within said first window, and wherein said current field is considered to be a candidate for being a repeated field when (i) a maximum sum of absolute differences (SAD) between co-located strip pairs is less than a product of a first predetermined value and a number of pixels in a strip, (ii) a maximum DC difference between co-located strip pairs in said current field and the immediately preceding field of the same parity is less than a product of a second predetermined value and the number of pixels in a strip, (iii) a number of fields in the window with SADs greater than a product of a third predetermined value and the SAD of the current field is greater than or equal to three, (iv) a number of fields in the window with a maximum DC difference greater than a product of a fourth predetermined value and the maximum DC difference of the current field is greater than or equal to three, and (v) in the current field and the seven preceding fields no more than four consecutive fields satisfy conditions (i) through (iv);
(B) confirming whether said current field is a repeated field using a second pattern-less approach when said first pattern-less approach finds that said current field is a repeated field, wherein said second pattern-less approach compares a plurality of current statistics of said current field with a plurality of previous statistics of a previous field of said video sequence and indicates that said current field is a repeated field when said current statistics approximate said previous statistics;
(C) generating a signal in (i) an asserted state when said current field is determined to be a repeated field and (ii) a deasserted state if said current field is not determined to be a repeated field; and
(D) encoding said current field using an encoder, wherein said encoder receives said plurality of fields in said video sequence and encodes said current field in an encoded bitstream by replacing said current field with a marker representing the current field when said signal is in said asserted state, and encoding the current field in the encoded video bitstream when said signal is in said deasserted state.

10. The method according to claim 9, further comprising a step of:
checking if said current field repeats according to a pattern-based approach to determine if said current field is part of any of said plurality of predetermined telecine patterns.

11. The method according to claim 9, wherein said second pattern-less approach comprises a step of:
calculating the sum-of-absolute differences between said current field and a plurality of previous fields in said video sequence over said first window of time.

12. The method according to claim 9, wherein said first pattern-less approach comprises a step of:
calculating the maximum difference of a plurality of differences between co-located strip pairs in said current field and said previous fields over said first window of time.

13. The method according to claim 12, wherein said second pattern-less approach further comprises a step of:
determining if said current field repeats over a second window of time that is longer than said first window of time.

14. The method according to claim 9, further comprising a step of:
averaging said current field with a previous field in said video sequence that said current field repeats to reduce a chrominance artifact in said current field.

15. A method for inverse telecine, comprising steps of:
(A) checking if a current field of a plurality of fields in a video sequence is a repeated field in said video sequence according to a 3:2 pull-down telecine pattern;
(B) checking if said current field is a repeated field in said video sequence according to a first cartoon telecine pattern;
(C) checking if said current field is a repeated field according to a first pattern-less approach when said current field is not a repeated field according to said 3:2 pull-down telecine pattern and said first cartoon telecine pattern, wherein (i) said first pattern-less approach indicates that said current field is a repeated field when said current field complies with a plurality of rules, (ii) said rules comprise limits regarding a number of repeated fields and a number of non-repeated fields in a window of time comprising a predetermined number of said fields, (iii) said limits are based on one or more characteristics of a plurality of telecine patterns, and (iv) said first pattern-less approach determines whether said current field is a repeated field based upon said one or more characteristics rather than finding an explicit telecine pattern within said window, and wherein said current field is considered to be a candidate for being a repeated field when (i) a maximum sum of absolute differences (SAD) between co-located strip pairs is less than a product of a first predetermined value and a number of pixels in a strip, (ii) a maximum DC difference between co-located strip pairs in said current field and the immediately preceding field of the same parity is less than a product of a second predetermined value and the number of pixels in a strip, (iii) a number of fields in the window with SADs greater than a product of a third predetermined value and the SAD of the current field is greater than or equal to three, (iv) a number of fields in the window with a maximum DC difference greater than a product of a fourth predetermined value and the maximum DC difference of the current field is greater than or equal to three, and (v) in the current field and the seven preceding fields no more than four consecutive fields satisfy conditions (i) through (iv);

(D) generating a signal in (i) an asserted state when said current field is determined to be a repeated field and (ii) a deasserted state if said current field is not determined to be a repeated field; and (E) encoding said current field using an encoder, wherein said encoder receives said plurality of fields in said video sequence and encodes said current field in an encoded bitstream by replacing the current field with a marker representing the current field, the marker is selected based on said signal and said current field is encoded as a predicted field using as a reference picture a previous field that said current field repeats when said signal is in said asserted state, and the current field is itself encoded in the encoded video bitstream when said signal is in said deasserted state.

16. The method according to claim 15, further comprising a step of:
confirming whether said current field is a repeated field using a second pattern-less approach when said first pattern-less approach indicates that said current field is a repeated field, wherein said second pattern-less approach compares a plurality of current statistics of said current field with a plurality of previous statistics of a previous field in said video sequence and indicates that said current field is a repeated field when said current statistics approximate said previous statistics.

17. The method according to claim 15, wherein said first cartoon telecine pattern comprises two of said fields pulled down from a first frame and three of said fields pulled down from a second frame adjoining said first frame.

18. The method according to claim 15, further comprising a step of:
checking if said current field repeats in a second cartoon telecine pattern comprising six of said fields pulled down from three consecutive frames and four of said fields pulled down from a next frame adjoining said three consecutive frames.

19. The method according to claim 15, further comprising a step of:
checking if said current field repeats in a second cartoon telecine pattern comprising four of said fields pulled down from a first frame and six of said fields pulled down from a second frame adjoining said first frame.

20. The method according to claim 15, further comprising a step of:
averaging said current field with a previous field of said video sequence to reduce a random noise in said current field.

21. The method according to claim 1, wherein said pattern-less approach comprises:
determining whether said current field is a candidate for being a repeated field based upon a first window having a first number of previous fields and a predefined candidate probability detection function; and
when said current field is considered to be a candidate for being a repeated field, determining whether to declare said current field is a repeated field based upon a second window having a second number of previous fields, where said second number of previous fields is larger than said first number of previous fields.

22. The method according to claim 21, wherein determining whether said current field is a candidate for being a repeated field comprises:
generating a corresponding filtered field for each field in said first window by passing each field through a multi-tap filter with predetermined coefficients;
dividing said current field and a corresponding filtered field into strips;
calculating the maximum of DC differences between co-located strip pairs in said current field and an immediately preceding field of the same parity; and
calculating the maximum sum of absolute differences (SAD) between co-located strip pairs in the filtered field corresponding to the current field and a filtered field corresponding to the immediately preceding field of the same parity.

23. The method according to claim 22, wherein said current field is declared to be a candidate when (i) the maximum sum of absolute differences (SAD) between the co-located strip pairs is less than the product of a first predetermined value and the number of pixels in a strip, (ii) the maximum DC difference between co-located strip pairs in said current field and the immediately preceding field of the same parity is less than the product of the second predetermined value and the number of pixels in a strip, (iii) the number of fields in the first window with SADs greater than the product of the third predetermined value and the SAD of the current field is greater than or equal to three, (iv) the number of fields in the first window with a maximum DC difference greater than the product of the fourth predetermined value and the maximum DC difference of the current field is greater than or equal to three, and (v) in the current field and the seven preceding fields no more than four consecutive fields satisfy conditions (i) through (iv).

24. The method according to claim 23, wherein said current field is declared to be a repeated field when (i) said current field is a candidate, (ii) the second window contains at least four repeated field candidates, and (iii) the SAD of the current field is less than a product of the first predetermined value and a running average of the most recent four SADs whose corresponding fields are repeated field candidates.

* * * * *